T. STEELE.
ARTIFICIAL TOOTH CUSP.
APPLICATION FILED JUNE 13, 1910.

997,472.

Patented July 11, 1911.

Witnesses
E. B. Maurer
A. L. Phelps

Inventor
Thomas Steele.
By C. C. Shepherd
Attorney

UNITED STATES PATENT OFFICE.

THOMAS STEELE, OF COLUMBUS, OHIO, ASSIGNOR TO THE COLUMBUS DENTAL MANUFACTURING COMPANY, OF COLUMBUS, OHIO, A CORPORATION OF OHIO.

ARTIFICIAL-TOOTH CUSP 997,472.      Specification of Letters Patent.     Patented July 11, 1911.

Application filed June 13, 1910. Serial No. 566,516.

*To all whom it may concern:*

Be it known that I, THOMAS STEELE, a citizen of the United States, residing at Columbus, in the county of Franklin and State of Ohio, have invented certain new and useful Improvements in Artificial-Tooth Cusps, of which the following is a specification.

My invention relates to improvements in the manufacture of artificial tooth cusps, which are set forth in the annexed specification and particularly pointed out in the claims.

The particular object of this invention is to provide an artificial tooth cusp so formed that all parts designed to come in contact with metal can be ground to an accurate standard overcoming the variations of shrinkage in the firing of the tooth and thereby removing obstacles to interchangeability.

Figure 1:
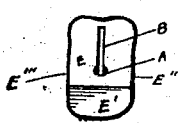
Figure 2:
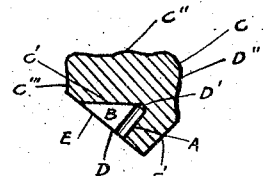
Figure 4:
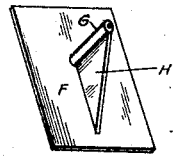
Figure 3:
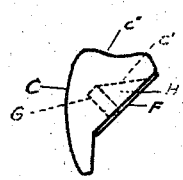
Figure 5:
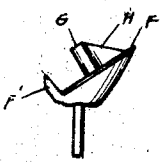
Figure 6:
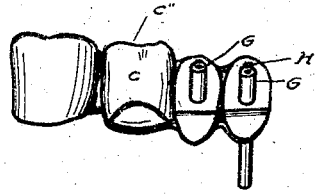

In the accompanying drawings—Figure 1 is a bottom plan view of a molar tooth cusp, Fig. 2 is a vertical section of the same, Fig. 3 is a sectional view of an alternative form of cusp, Fig. 4 is a perspective view of the backing supporting the tongue and rib, Fig. 5 is a side view of the backing employed in a Richmond crown, and, Fig. 6 is a perspective view of a denture showing the cusp and plate in position.

Similar reference characters indicate similar parts in all the drawings.

The tooth cusp C of a standard size, is molded of porcelain or other suitable material. A tubular recess A is formed centrally with the tooth cusp perpendicular to the base E, and a slot B opens the recess perpendicularly and extends to a line in the plane of the axis of the cusp from the bottom D' of the recess, parallel to the grinding surface C'' of the cusp and meeting the base E below its intersection with the labial aspect C'''.

Owing to the shrinkage and unavoidable inequalities in the porcelain, the recess and slot cannot be minutely or accurately standardized by the processes of molding and baking. My improved tooth is molded and fired with the slot and recess in such rudimentary form therein as can be formed by a pattern. It being designed to locate the recess D with precision centrally in the tooth cusp and perpendicularly to the base E thereof, and the slot B centrally and perpendicularly to the lingual aspect D'' thereof, the faces E and E' of the cusp are ground to perfectly flat surfaces respectively to remove the numerous inequalities in the surfaces as the cusp came from the oven, when it is mechanically centered and the recess D drilled in the true plane of the cusp's axis by a drill much smaller than the ultimate standard size of said recess and the drill is positively actuated in the plane of the axis without guidance from the rudimental recess formed with the tooth cusp. This process of drilling is repeated with drills successively larger than the first until a recess is formed of a certain standard diameter, penetrating in every instance to an accurately determined point at a standard distance from the cusp C'' and the lingual aspect D'' of the tooth cusp.

By methods of precision, the slot B leading into the recess throughout its length and of less diameter than the recess, is corrected from the rudimental slot formed with the tooth cusp, to a slot bi-laterally symmetrical with the axis of the tooth cusp with walls parallel to the plane of the mesial and distal faces E'' and E''' of the cusp.

The formation of the rudimentary slot and recess in the cusp prior to baking, is imperative for the reason that it is a practicable impossibility to drill porcelain for commercial purposes without adding enormously to the expense. The drilling is, however, much simplified and rendered commercially possible where a recess is chipped or reamed out by one or more drills, from a rudimentary recess as set forth.

For the appropriate mounting of my improved tooth front in any required denture, a tongue G in the form of a cylindrical shell is formed with a rib H and mounted on a backing F in the mathematical line of its longitudinal axis, precise methods being here also employed to the end that the tongue shall exactly fill the recess in the tooth front, and the rib H, the slot B therein.

What I claim, is—

1. An artificial tooth cusp having a flat base ground at an angle divergent to the plane of the masticating cusp and having a longitudinal recess therein arranged at an angle to the base of the cusp and a slot of less diameter than the recess opening the latter perpendicularly to the plane of grinding to a point near the lingual termination of the plane of grinding.

2. An artificial tooth cusp having a flat base at an angle divergent to the plane of the masticating cusp from the lingual aspect of the tooth, meeting a second plane in a line parallel to its lingual aspect, a tubular recess of one standard size, perpendicular to said flat base and centrally disposed therein, a slot of less diameter than the recess opening from the recess vertically to the flat surface to a point near to the lingual surface of the cusp.

In testimony whereof I affix my signature in presence of two witnesses.

THOMAS STEELE.

Witnesses:
C. C. SHEPHERD,
J. W. CHAMPION.